United States Patent [19]

Barbera et al.

[11] Patent Number: 5,234,687
[45] Date of Patent: Aug. 10, 1993

[54] METHOD OF MAKING AN UNFLAVORED PSYLLIUM DRINK MIX

[75] Inventors: Melvin A. Barbera, Cincinnati; Larry E. Burns, Goshen; Amy M. Martini, Cincinnati, all of Ohio

[73] Assignee: The Procter & Gamble Company, Cincinnati, Ohio

[21] Appl. No.: 779,683

[22] Filed: Oct. 21, 1991

[51] Int. Cl.$^5$ ............................................. A61K 35/78
[52] U.S. Cl. ................................................. 424/195.1
[58] Field of Search ....................................... 424/195.1

[56] References Cited

U.S. PATENT DOCUMENTS

| | | | |
|---|---|---|---|
| Re. 32,811 | 12/1988 | Rudin | 424/195.1 |
| 2,060,336 | 11/1936 | Near et al. | 99/131 |
| 3,455,714 | 7/1969 | Bishop et al. | 106/205 |
| 4,321,263 | 3/1982 | Powell et al. | 424/195 |
| 4,341,805 | 7/1982 | Chaudhary | 426/481 |
| 4,459,280 | 7/1984 | Colliopoulos et al. | 424/35 |
| 4,511,561 | 4/1985 | Madaus et al. | 424/195.1 |
| 4,548,806 | 10/1985 | Colliopoulos et al. | 424/35 |
| 4,551,331 | 11/1985 | Rudin | 424/195.1 |
| 4,557,938 | 12/1985 | Sander et al. | 426/453 |
| 4,565,702 | 1/1986 | Morley et al. | 426/93 |
| 4,619,831 | 10/1986 | Sharma | 426/93 |
| 4,731,246 | 3/1988 | Chavkin et al. | 424/195.1 |
| 4,737,364 | 4/1988 | Kalogris | 424/195.1 |
| 4,747,881 | 5/1988 | Shaw et al. | 106/209 |
| 4,828,842 | 5/1989 | Furst et al. | 424/195.1 |
| 4,950,140 | 8/1990 | Pflaumer et al. | 424/195.1 |
| 5,048,760 | 9/1991 | Barbera et al. | 241/9 |

FOREIGN PATENT DOCUMENTS

| | | |
|---|---|---|
| 105195 | 4/1984 | European Pat. Off. |
| 144644 | 6/1985 | European Pat. Off. |
| 362926 | 4/1990 | European Pat. Off. |
| 412604 | 2/1991 | European Pat. Off. |
| 2616329 | 12/1988 | France |
| WO80/00658 | 4/1980 | PCT Int'l Appl. |
| WO85/01441 | 4/1985 | PCT Int'l Appl. |

OTHER PUBLICATIONS

Physicians Desk Reference for Nonprescription Drugs, 10th Edition, pp. 641-642 (1989): "Orange Flavor Metamucil ®; Strawberry Flavor Metamucil ®; Sugar Free Orange Flavor Metamucil ®; Sugar Free Lemon-Lime Flavor Effervescent Metamucil ®; Sugar Free Orange Flavor Effervescent Metamucil ®"; sold by The Procter & Gamble Company.

*Primary Examiner*—Frederick E. Waddell
*Assistant Examiner*—K. Weddington
*Attorney, Agent, or Firm*—Kim William Zerby; Douglas C. Mohl; Jack D. Schaeffer

[57] ABSTRACT

Unflavored psyllium husk-containing drink mix compositions are prepared consisting essentially of small particle size psyllium husk comprising less than about 10% of psyllium husk having particle sizes larger than about 60 mesh screen, less than about 2.0% edible acid, and sugar. Such compositions are unflavored so as to permit mixing small particle size psyllium, which is readily suspended in a liquid without a gritty texture, with a broader selection of liquids, such as milk and fruit drinks, without rapid gelling of the psyllium husk.

4 Claims, No Drawings ns of psyllium husk.  Such compositions are useful for allowing the consumer to choose a wide variety of liquids for suspending the psyllium husk, for example milk and fruit juices, without substantial flavor impact by the psyllium-containing drink mix compositions.  The addition of the low levels of edible acid is acceptable from a taste perspective since the levels used are such that there is little or no perception of their presence in the drink compositions yet this low level is sufficient and necessary to slow the gellation rate for the small particle size psyllium husk being utilized.

METHOD OF MAKING AN UNFLAVORED PSYLLIUM DRINK MIX

BACKGROUND OF THE INVENTION

The present invention relates to unflavored psyllium husk-containing drink mix compositions consisting essentially of small particle size psyllium husk comprising less than about 10% of psyllium husk having particle sizes larger than about 60 mesh screen, less than about 2.0% edible acid, and sugar, and wherein further said compositions are in a form to be mixed with a liquid to form a suspension of the psyllium husk. Such compositions are useful for allowing the consumer to choose a wide variety of liquids for suspending the psyllium husk, for example milk and fruit juices, without substantial flavor impact by the psyllium-containing drink mix compositions. The addition of the low levels of edible acid is acceptable from a taste perspective since the levels used are such that there is little or no perception of their presence in the drink compositions yet this low level is sufficient and necessary to slow the gellation rate for the small particle size psyllium husk being utilized.

Products containing psyllium seed husk are known (e.g., Metamucil®, sold by The Procter & Gamble Company). Such products are useful for the benefit of normalizing bowel function and laxation. In addition, recent research has demonstrated the effectiveness of psyllium seed husk fiber in reducing human serum cholesterol levels and in controlling blood glucose levels in diabetics.

Over the recent years, much development work has gone into further improving the aesthetics of psyllium-containing compositions. One important development has been the discovery that the particle size of psyllium husk can be substantially reduced and yet still maintain the efficacy of the psyllium husk. Further, the aesthetics of drink mix compositions containing such small size psyllium husk are improved by eliminating the gritty texture associated with the previously used larger size psyllium husk and by dramatically increasing the suspendability of the psyllium husk. Such improved compositions are described, for example, in European Patent Application Publication No. 362,926, published Apr. 11, 1990, by the Procter & Gamble Company, incorporated by reference herein in its entirety.

Further, it has been shown that by coating psyllium husk with edible acids for use in drink mix compositions which are sugar free or have only low levels of sugar, the mixability of such compositions are greatly improved. This technology is described, for example, in European Patent Application Publication No. 412,604, published Feb. 13, 1991, by the Procter & Gamble Company, incorporated by reference herein in its entirety.

Through attempts to produce an unflavored drink mix version of the small particle size psyllium husk, it was realized that while readily mixable and suspendable compositions can be prepared, the rate of gellation for such compositions are unacceptably rapid when the acidic flavoring agents were not included. The rate of gellation mandated rapid consumption of the drink composition or else a very viscous composition had to be consumed. It has been discovered, however, that the rate of gellation can be slowed down to an acceptable rate by using only low levels of edible acid, lower than levels at which it is readily perceived in drink mix compositions (which is generally lower than about 2.0%). The level of sugar utilized in such compositions must be at a high enough level to allow for good mixability of the compositions.

Sugared psyllium-containing products containing high levels of certain edible acids are known, having been described for example in U.S. Pat. No. 2,060,336, to Near et al., issued Nov. 10, 1936, incorporated by reference herein in its entirety. Interestingly, though, this patent describes that it is desirable to add a "requisite amount of acid, such as citric, tartaric, malic or any other similar acids satisfactory for the production of the desired sour taste." (At page 3, column 1, lines 69-72.) This is said to be necessary to enhance the gelling properties of the psyllium: "Where a powdered product is produced from which gels or dispersions are to be subsequently formed, it is desirable that the product be slightly acid in character for the production of the best results. Care must be taken to avoid the presence of a pH lower than approximately 2, because a more acid condition acts to destroy to some extent, the jelling properties." (At page 3, column 1, lines 38-45). Such teachings make it all the more surprising that the low levels used herein, which avoid substantial taste impact in sugared unflavored drink mix compositions according to the present invention, reduce the gellation rate of small particle size psyllium.

It is therefore an object of the present invention to provide unflavored psyllium-containing drink mix compositions consisting essentially of low levels of edible acid which do not produce substantial flavor impact, sugar, and small particle size psyllium. A further object is to provide such compositions having not only acceptable mixability, dispersibility and suspendability in a variety of liquids, including milk and fruit juices, but also reduced gellation properties such that the viscosity of the liquid suspension is acceptable during the usual period of time required for consumption of the liquid suspension.

These and other objects of the present invention will become readily apparent from the detailed description which follows.

All percentages and ratios used herein are by weight unless otherwise specified. Screen mesh sizes used herein are based on U.S. standards unless otherwise stated.

SUMMARY OF THE INVENTION

The present invention relates to unflavored psyllium-containing drink mix compositions consisting essentially of:

(a) from about 10% to about 95% of small particle size psyllium husk comprising less than about 10% of psyllium husk having particle sizes larger than about 60 mesh screen;

(b) from about 0.1% to about 2.0% edible acid; and (c) from about 5% to about 90% of sugar;

and wherein further said compositions are in a form mixable with a liquid to form a suspension of the psyllium husk.

DETAILED DESCRIPTION OF THE INVENTION

As noted hereinbefore, it has been discovered that low levels of edible acids, lower than the levels at which their presence is readily perceived by the consumer's taste perception when dispersed in a liquid, are necessary for and capable of decreasing the otherwise rapid rate of gellation associated with using small particle size psyllium husk for liquid drink compositions. The lack of flavor impact observed for such compositions is desirable when unflavored versions of psyllium drink mix compositions are being prepared. Such compositions are particularly useful to consumers who desire to suspend the psyllium husk in a liquid other than just water, such as milk or fruit drink or other drinks favored by the individual consumer.

The components of the compositions according to the present invention, and representative amounts, are described in detail as follows.

Psyllium Husk

The psyllium husk used in the present invention is from psyllium seeds, from plants of the Plantago genus. Various species such as *Plantago lanceolate. P. rugelii.* and *P. major* are known. Commercial psyllium husk include the French (black; *Plantaqo indica*), Spanish (*P. psyllium*) and Indian (blonde; P. ovata). Indian (blonde) psyllium husk is preferred for use herein. Also preferred is psyllium husk which is at least about 85% pure, more preferably at least about 90% pure, and most preferably at least about 95% pure.

The psyllium husk is obtained from the seed coat of the psyllium seeds. It is typical to remove the seed coat from the rest of the seed by, for example, slight mechanical pressure, and then to use only the seed coat. The seed coat is preferably removed and sanitized by methods known in the art. Preferred is sanitized psyllium seed husk having substantially intact cell structure, the sanitization having been accomplished by methods such as ethylene oxide sanitization and superheated steam sanitization (as taught in U.S. Pat. No. 4,911,889, to Leland et al., issued Mar. 27, 1990, the disclosures of which are incorporated herein by reference in their entirety).

Psyllium husk utilized for compositions of the present invention has small particle size comprising psyllium husk particle sizes distributed such that less than about 10% is larger than about 60 mesh, and more preferably less than about 15% is larger than about 80 mesh. Further preferred particle sizes are as follows: less than about 15% larger than about 80 mesh, at least about 40% within the range of from about 80 mesh to about 200 mesh, and less than about 50% smaller than about 200 mesh. More preferred are particle size distribution of: less than about 10% larger than about 80 mesh, at least about 50% within the range of from about 80 mesh to about 200 mesh, and less than about 50% smaller than about 200 mesh.

It is also preferred that the psyllium husk further comprise less than about 5% of particle sizes larger than about 60 mesh, and most preferably essentially no particle sizes larger than about 60 mesh. Also preferred is less than about 5% larger than about 80 mesh, and most preferred is essentially no particle sizes larger than about 80 mesh and less than about 25% larger than 100 mesh. Particle sizes and particle size distributions may be readily determined by one of ordinary skill in the art, for example by sieving using an Alpine Laboratory Air Jet Sieve, Type 200 LS (sold by Alpine American Corp., Natick Mass.).

The unflavored drink mix compositions preferably contain from about 10% to about 95%, more preferably from about 20% to about 75%, most preferably from about 25% to about 60%, of this small particle size psyllium husk.

Edible Acids

The term "edible acids", as used herein, means any water soluble acid material having a $pK_a$ of less than about 5, preferably within the range of from about 2 to about 5, and is safe for ingestion by humans. Examples of edible acids include, but are not limited to, citric acid, ascorbic acid, malic acid, succinic acid, tartaric acid, phosphoric acid, monopotassium phosphate, and mixtures thereof. Preferred are phosphoric acid and citric acid, with citric acid being most preferred.

The compositions of the present invention consist essentially of from about 0.1% to about 2.0% edible acid, preferably from about 0.5% to about 1.5%, and more preferably from about 0.5% to about 1.0%. It is to be noted that for purposes of the present invention, it is preferred but not necessary that some or all of the edible acid be coated on the psyllium husk.

Sugar

In addition, the psyllium husk-containing compositions according to the present invention consist essentially of sugar at a level capable of allowing the small particle size psyllium husk to readily mix in a liquid, preferably within the range of from about 5% to about 90%, more preferably from about 25% to about 80%, and most preferably from about 40% to about 75%, by weight of the drink mix composition. Further preferred is coating or agglomerating the psyllium husk with some or all of the sugar, especially if the lower levels of sugar with higher levels of psyllium husk are desired to be utilized.

The term "sugar", as used herein, means mono-saccharides and di-saccharides whether or not such materials are coated on the psyllium husk or are otherwise present in the compositions. Mono-saccharides are those carbohydrates that in general are aldehyde-alcohols or ketone alcohols that are a hexose or pentose and have a sweet taste. They are readily soluble in water and form crystalline solids. Examples of the mono-saccharides are dextrose, mannose and fructose. Di-saccharides are those carbohydrates which yield two mono-saccharides on hydrolysis. Examples of di-saccharides are lactose, sucrose and maltose.

Methods for Manufacturing

As noted hereinbefore, preferred compositions of the present invention are those which have some or all of the edible acid and/or sugar coated on the psyllium husk, and further preferably such that the psyllium husk is agglomerated. Preferred single layer coating of the psyllium husk is achieved by utilizing equipment (referred to herein as single pass fluidizing powder wetting apparatus) which operates preferably by dropping a dry blend psyllium-containing material through a highly turbulent annular zone formed by a cylindrical wall and a rotating shaft with variously pitched attached blades. An edible acid-containing solution is sprayed into this zone to contact a dry psylliumcontaining blend. The resulting coated, preferably agglomerated, psyllium husk is dropped to a fluid bed dryer where the added solvent is removed. An example of this equipment is the Bepex Turboflex Model No. TFX-4 (sold by Bepex Corporation; Minneapolis, Minnesota) with a six square foot bed vibrating fluid bed dryer (sold by Witte Corporation, Inc.; Washington, New Jersey).

The psyllium-containing blend preferably comprises from about 10% to about 95% of psyllium and also from about 5% to about 90% of sugar. Coloring agents and/or pharmaceutical agents are examples of other materials which may be present in this blend. As noted hereinbefore, it is preferred that the psyllium-containing blend be dry, but it is possible to utilize suitable solvents (e.g., alcohols and/or water) if one is careful, especially if water is utilized, not to cause substantial hydration and swelling of the psyllium with subsequent drying, since this is expected to adversely affect the rate at which psyllium husk can interact with water or other fluids.

The solution mixture comprising one or more edible acids to be sprayed onto the psyllium-containing blend will be prepared by selecting a liquid (e.g., alcohol and/or water) as appropriate for the edible acid(s) being coated onto the psyllium husk. However, it is preferred that water be utilized. Preferred is also spraying the solution mixture onto a dry psyllium-containing blend. Preferably, when a spraying technique is used, the solution mixture is an aqueous solution comprising from about 0.5% to about 80% (preferably from about 5% to about 50%) of edible acid. It is also optionally possible to repeat the coating and drying steps of the present process, thereby building up a coating on the psyllium husk which comprises several thin layers of the edible acid. In addition, other optional materials may be present in the solution mixture, such as coloring agents, pharmaceutical agents, and mixtures thereof.

Other methods for preparing compositions according to the present invention include dry blending the ingredients and other means for multiple layer coating of the psyllium husk. The latter may be accomplished by using, for example, fluid bed agglomerating equipment such as the Fluid Air, Inc. Model 0300 Granulator-Dryer.

While it is desirable to prepare agglomerated psyllium husk according to the present invention such that the product collected after the coating process is ready for ingestion by mixing it in a liquid, it is also possible to add materials such as any remaining amount of sugar or edible acid, coloring agents, and/or pharmaceutical agents to the agglomerated psyllium husk to provide the unflavored psyllium-containing drink mix product according to the present invention.

The following example further describes and demonstrates an embodiment within the scope of the present invention. This example is given solely for the purpose of illustration and is not to be construed as limitations of the present invention, as many variations thereof are possible without departing from the spirit and scope.

EXAMPLE

A dry blend of 46.4% psyllium/53.6% sucrose is charged into a Bepex Model No. TFX-4 agglomerator. As the dry blend is charged into the agglomerator, an 11.7% aqueous citric acid solution is sprayed onto the powder to form agglomerates. The agglomerates are then dried in a Schugi fluid bed dryer (5 square foot model), followed by screening in a Sweco vibrating screener (Vibro-Energy Separator LS 308866; size 38 TBC) to yield the unflavored psyllium-containing drink mix composition. The final product formula is 46% psyllium, 53.1% sucrose, and 0.9% citric acid. This composition is readily mixable in water to provide a psyllium suspension having reduced viscosity, and is mixable in a variety of liquids for human consumption without unacceptably noticeable flavor impact. Consumption of a drink prepared by mixing 1 teaspoon of this drink mix composition (approximately 7.4 grams containing about 3.4 grams psyllium) in 8 ounces of milk provides effective laxative benefits to a patient in need of such benefit.

What is claimed is:

1. A method for manufacturing an unflavored psyllium-containing drink mix composition having reduced gellation rate, said method comprising manufacturing the drink mix composition to contain small particle size psyllium husk comprising less than about 10% of particles larger than about 60 mesh and edible acid at a level high enough to slow the gellation rate of the small particle size psyllium husk but below a level whereby the edible acid is a flavorant.

2. The method according to claim 1 wherein the edible acid is selected from the group consisting of citric acid, ascorbic acid, malic acid, succinic acid, tartaric acid, phosphoric acid, monopotassium phosphate, and mixtures thereof.

3. The method according to claim 2 wherein the edible acid is citric acid at a level within the range of from about 0.1% to about 1.0%.

4. The method according to claim 3 wherein the manufacturing further comprises coating or agglomerating the psyllium husk, and wherein further the citric acid is at a level within the range of from about 0.1% to about 0.5%.

* * * * *